United States Patent [19]
Feldt

[11] Patent Number: 5,868,312
[45] Date of Patent: Feb. 9, 1999

[54] CLIMATE CONTROL DEVICE FOR MOTOR VEHICLES

[75] Inventor: Kent Feldt, Västra Frölunda, Sweden

[73] Assignee: AB Volvo, Sweden

[21] Appl. No.: 898,352

[22] Filed: Jul. 22, 1997

[51] Int. Cl.⁶ .................................. F04F 5/22; F24F 7/00
[52] U.S. Cl. .......................................... 236/49.3; 417/167
[58] Field of Search ..................................... 417/163, 167; 236/49.3, DIG. 19

[56] References Cited

U.S. PATENT DOCUMENTS

| | | | |
|---|---|---|---|
| 3,520,639 | 7/1970 | Hanes | 417/167 |
| 3,743,180 | 7/1973 | Perkins et al. | 236/DIG. 19 |

FOREIGN PATENT DOCUMENTS

| | | |
|---|---|---|
| 0 159 404 | 10/1985 | European Pat. Off. . |
| 2 507 700 | 12/1982 | France . |
| 35 41 263 | 5/1988 | Germany . |
| 30 33 624 | 10/1992 | Germany . |
| 92/05044 | 4/1992 | WIPO . |

*Primary Examiner*—William Wayner
*Attorney, Agent, or Firm*—Lerner, David, Littenberg, Krumholz & Mentlik

[57] ABSTRACT

The invention relates to a climate control device for temperature regulation of passenger compartments in motor vehicles. The device comprises an air treatment chamber (2) through which incoming air to the passenger compartment is made to flow via channels from air intake (4) to air outlet (5) to be temperature-regulated depending upon a nominal value and an actual value for the air temperature in the passenger compartment. The actual value is detected using at least one temperature sensor (12) located in the passenger compartment, and an air stream is created at the sensor by means of a suction duct which is connected to a suction inlet (19) of an ejector (16). The ejector is transversed by streaming air via a pressure inlet (27) and outlet (33) in the air treatment chamber. The ejector (16) has a substantially funnel-shaped jacket (34) widening around the outlet and is located in the air treatment chamber (2) or connecting channels so that its pressure inlet (27) and funnel-shaped jacket is transversed by streaming air in a direction away from the pressure inlet. The air is flowing partly through the outlet and partly surrounding the funnel-shaped jacket.

4 Claims, 3 Drawing Sheets

CLIMATE CONTROL DEVICE FOR MOTOR VEHICLES

TECHNICAL FIELD

The present invention relates to a climate control device for the regulation of the temperature of the passenger compartment of motor vehicles according to the appended claim 1.

BACKGROUND OF THE INVENTION

Climate control devices for motor vehicles are in a varying degree provided with automatic temperature regulation, where air is treated, generally through heating and possibly also through cooling, depending upon the type of device and whether the ambient air is colder or warmer than the desired temperature inside the passenger compartment of the vehicle. For this purpose, the passenger compartment is provided with one or more temperature sensors which, for practical reasons, have to be located in the vicinity of a passenger compartment surface. To obtain a representative temperature reading, it is previously known to create an air stream past the sensor using a suction conduit. The required negative pressure is in this case created by an ejector which uses the air stream which is created in the climate control device. The air stream has been led through the ejector, located outside the air treatment chamber, in such a way that a local air stream is created in the passenger compartment, something which may be regarded as being irritating.

SUMMARY OF THE INVENTION

The object of the present invention is to provide a climate control device with which the ejector does not create any comfort reducing air stream in the passenger compartment of the vehicle.

Said object is achieved by a climate control device, whose features are detailed in appended claim 1.

BRIEF DESCRIPTION OF THE DRAWINGS

The invention will be described in greater detail in the following by way of examples and with reference to the accompanying drawings, in which FIG. 1 schematically shows a climate control device for a motor vehicle provided with an ejector according to the invention.

PREFERRED EMBODIMENT

Figure 1:
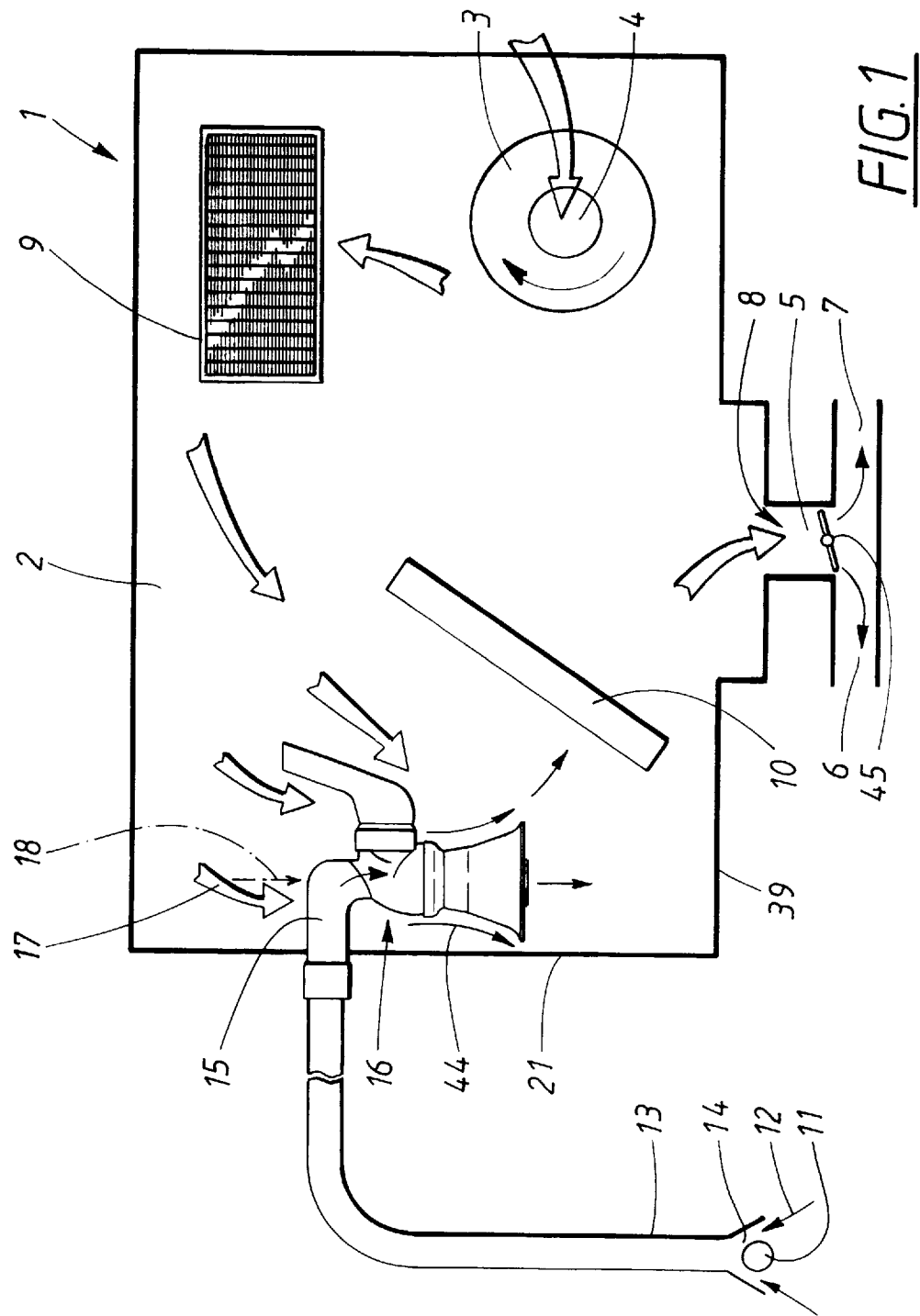

The schematic view according to FIG. 1 shows a climate control device for motor vehicles where its physical structure with conduit systems and air intakes and air outlets is only generally indicated. The climate control device has a central unit 1 having an air treatment chamber 2, which is provided with a fan 3 which may be switched on to replace or augment the air stream through the device created by the relative air velocity between the vehicle and the outside air during vehicle movement. An air intake 4 is coupled to the fan. The fan may on the one hand be connected to the outside of the passenger compartment, i.e. the cab, which is to be temperature-regulated and on the other hand, may comprise a recirculation intake for closed recirculation in the cab. From the air treatment chamber 2, there runs an air outlet 5 which is branched off to different locations via subconduits 6, 7 in the vehicle. To regulate the air streams, there are a plurality of different conduits and valves, but for clarity only one valve 8 for regulating the air outlet is shown.

Furthermore, in the air treatment chamber 2 there are different temperature-influencing devices, usually at least one heating means 9, which may utilize the engine heat through a heat exchanger via a cooling water medium or air-borne heat or can be an electrically powered heating element. The climate control device may possibly be provided with a cooling means, for example in the form of an evaporator 10, through which an air stream is brought to pass in the air treatment chamber for the purpose of lowering the air temperature.

For regulation of the temperature in the vehicle cab there is arranged at least one temperature sensor 11 which is located in a suitable position in the cab. For practical reasons, it is located close to a surface or an object in the cab which, through heat radiation, may provide the temperature sensor 11 with a temperature reading which deviates from the average temperature in the area which is to be monitored. Accordingly, an air stream, see arrow 12, is made to pass the temperature sensor for temperature equalizing purposes. In order to create this air stream, a suction conduit 13 is arranged with an opening 14 which is located in the close vicinity of the temperature sensor. Furthermore, the suction conduit 13, at its opposite end, is connected to an ejector 16 which, according to the invention, is located inside the air treatment chamber 2 so that air streams 17 which are produced by pressure changes in the air treatment chamber either by the fan 3 or the air stream created by the relative air velocity between the vehicle and the outside air during vehicle movement, or a combination of both flow over and surround the ejector. The ejector 16 is aimed in an appropriate manner so that it is subjected to an air flow in a main direction which as far as possible coincides with the longitudinal axis of the ejector from inlet side to outlet side, i.e. that which is indicated with a dashed and dotted arrow 18.

Figure 2:
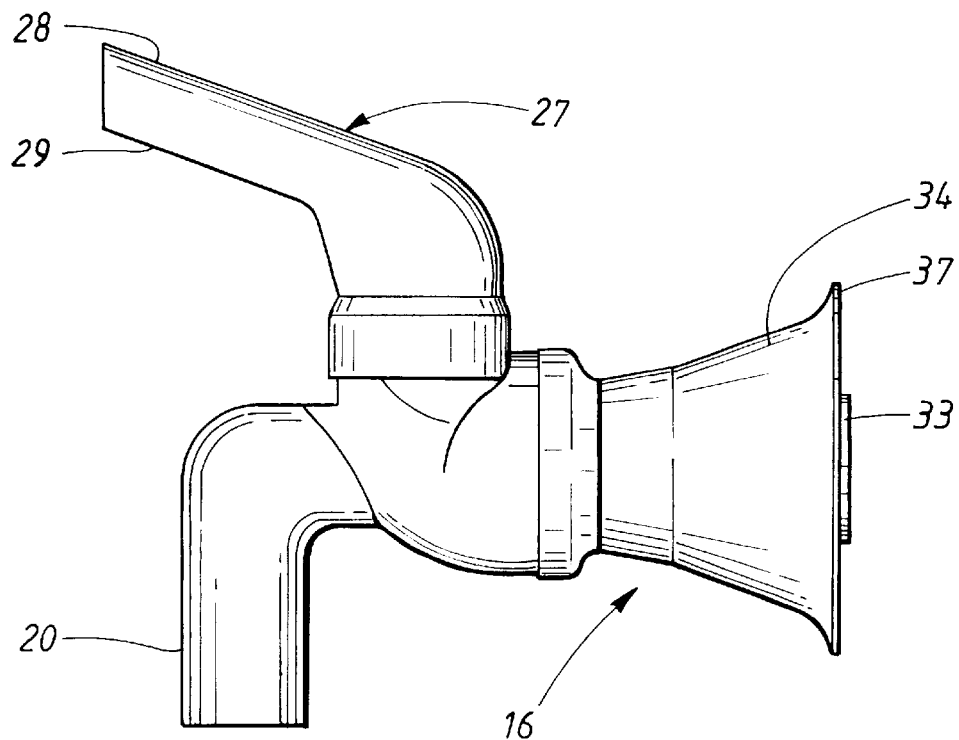
FIG. 2 shows a side view of the ejector comprised in the climate control device.
Figure 3:
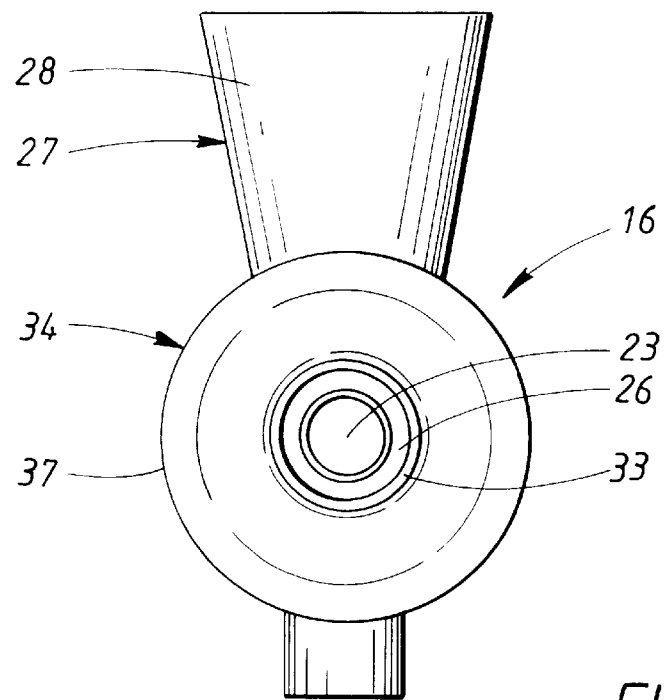
FIG. 3 shows a front view of the ejector, whilst
Figure 4:
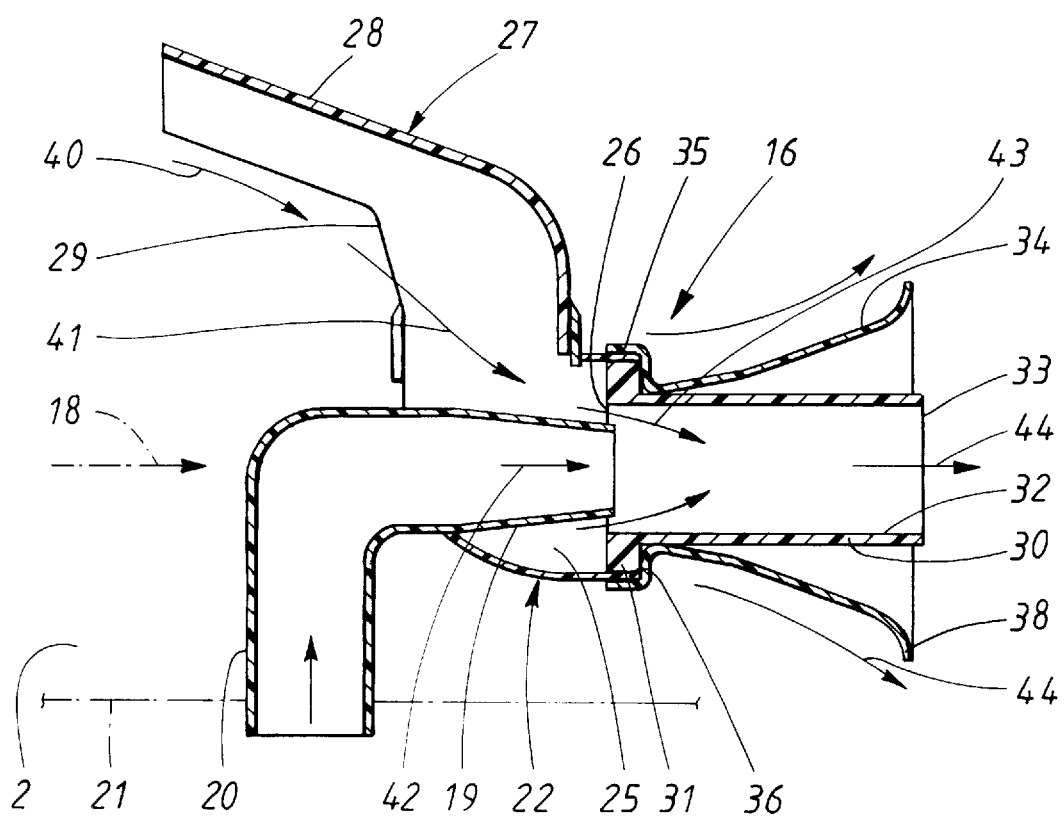
FIG. 4 shows a longitudinal cross-section through the ejector.

The more detailed construction of the ejector is best apparent from FIGS. 2, 3 and 4. The ejector has a suction inlet tube 19 which, in the shown example, is angled and comprises a section 20 which is angled away from the main direction of the ejector according to the arrow 18 and which passes through the wall 21 of the air treatment chamber 2 and may, using a suitable fastening means, form the mechanical support for the ejector 16 in the central unit 1. The suction inlet tube 19 thereby constitutes a part of the suction conduit 13, the outer end of which is associated with the temperature sensor 11. The suction inlet tube 19 merges with an ejector housing 22 and is provided with a section 24 inside the ejector which tapers conically towards a circular opening 23. The ejector housing 22 forms a duct 25 which encompasses the conical section 24 and which becomes an annular channel 26 running around the opening 23. The ejector further has a pressure inlet 27, which merges with the encompassing duct 25 and is shaped like a capturing section or air scoop provided with an angled wall 28, having a suitable inclination relative to the main direction 18 and which widens in the rearward direction, see FIG. 3, and an opening 29 in the opposed direction to the main direction 18. The ejector furthermore has an outlet tube 30 which, in the shown example, is cylindrical and is provided with an inner annular edge, which is shaped like a flange 31 and is fastened to the ejector housing 22 so that the annular edge is located substantially in the same radial plane as the opening 33 of the suction inlet. The inner edge of the outlet tube 30, i.e. the flange 31, thereby forms the outer contour of the annular channel 26. The tube 30 forms an outlet duct 32 having a circular opening 33.

According to the invention, the ejector is provided with a funnel-shaped jacket 34 which expands in the main direction 18 and attaches to the housing 22 using a flange 35 which, seen in the main direction 18, is located beyond the pressure inlet 27. The flange 35 is shaped so that the ejector housing 22 merges into the funnel-shaped jacket via a step 36, which provides a tapering of the ejector at the inner end of the jacket for it to widen substantially conically to a diameter which, at the outer edge 37 of the jacket, has a cross-sectional dimension which substantially exceeds the cross-sectional dimension at the inner edge and, in the shown example, is in the order of twice this cross-sectional dimension. In the shown example, the largest outer diameter of the jacket is approximately twice the outer diameter of the outlet 33 of the ejector. More specifically, the outer edge of the jacket 34 is, in the example, provided with a flange-like edge 38 which merges into a more or less radial direction. As is apparent from FIG. 2 and the cross-section according to FIG. 4, the funnel-shaped jacket 34, more precisely its outer edge 37, and the outlet opening 33 are located substantially in the same radial plane, although, preferably having the outlet opening 33 protruding somewhat beyond or outside the edge 37.

The prerequisite for the functioning of the ejector is that an air stream is present in the air treatment chamber 2 such that a pressure drop arises in the main direction 18 of the ejector, i.e. from its inlet side to its outlet side. Such a pressure drop may arise in several different locations in the air treatment chamber or other parts of the system, for what reason its placement suitably is done through testing. Advantageously, the ejector may be placed relatively close to one of the walls 21 of the air treatment chamber, as is shown in the example, and having at least some gap between the outer edge 38 of the funnel-shaped portion and with such a distance to the closest transverse wall 39 that the air stream past the ejector is not influenced. The negative pressure created by the ejector in the suction conduit 13 and, hence, the desired air stream past the temperature sensor 11 is, according to the invention, essentially achieved in the following manner, which will be described with reference mainly to FIG. 1 and FIG. 4. A part of the air stream in the air treatment chamber 2 is received by the capturing section 27, whereby air is guided into the ejector, see arrows 40, 41, 42, 43. From the capturing portion, the air stream is guided through the annular channel 26 and into the outlet tube 32. The remaining part of the air streams in the area around the ejector is guided past the ejector along its outside and is made to surround the ejector housing 22 and the funnel-shaped portion 24, see arrows 44. Owing to the air streams both outside the conical portion 34 and through the ejector, a strengthened two-stage ejector effect is obtained. The funnel-shaped jacket 34 creates an increased pressure drop in the ejector and a large flow velocity through the ejector tube 32 by guiding the air stream so that it diverges from the main direction 18 of the ejector. This, in turn, creates an ejector effect in a second stage with a negative pressure in the area of the ejector inlet at the opening 23, which creates a negative pressure in the suction tube 30 and an efficient air stream past the temperature sensor 11, even if the flow velocity of the air in the chamber 2 should not be particularly great.

The temperature sensor 11 is a part of a regulating system for temperature regulation, for example through regulation of an air blending valve or a outlet valve 45, which is shown by way of example in FIG. 1. The temperature sensor can also be used to regulate heating element 9 or cooling device 10 to represent an actual value (in a regulating system) for the temperature in the cab and to regulate the temperature depending upon a pre-set nominal value of the temperature.

The invention is not limited to the description above nor to the examples shown on the drawings, but can be varied within the scope of the appended claims. For example, the detailed construction of the ejector may be effected in many different ways having another design of the capturing portion and the funnel-shaped jacket. The climate control device may be provided with a heating device only, i.e. the cooling device may be omitted. The climate control device may be automated to a larger or lesser degree, for example through pre-setting the temperature using a manually operated control which alters the temperature depending upon the ambient temperature outside the cab. A plurality of temperature sensors and regulating systems may be comprised in the device for detection of different temperature zones in the cab. The suction conduit 13 may then be branched out to each and every one of the sensors or, alternatively, several ejectors are located in the air treatment chamber 2. The ejector may also be placed in another location, also in different areas, where the ventilation air passes, for example inlet or outlet ducts.

I claim:

1. A climate control device for temperature regulation of the passenger compartment of motor vehicles, comprising an air treatment chamber including an air intake and an air outlet whereby incoming air to the passenger compartment is made to flow from said air intake to said air outlet to be temperature-regulated depending upon a nominal value and an actual value of the air temperature at at least one location in the passenger compartment, at least one temperature sensor for detecting said actual value located in the passenger compartment, a suction conduit for creating an airstream at said temperature sensor an ejector in said air treatment chamber including a suction inlet connected to said suction conduct, said ejector including a pressure inlet, an outlet and a substantially funnel-shaped jacket widening around said outlet, said ejector being located in said air treatment chamber or connecting channels so that said pressure inlet and funnel-shaped jacket is transversed by streaming air in a direction away from said pressure inlet, partly through said outlet and partly surrounding said funnel-shaped jacket.

2. A climate control device according to claim 1, wherein said pressure inlet has the shape of an air scoop provided with a wall, said wall being inclined relative to the main direction of said ejector and widening in the rearward direction, and an opening aimed in the opposed direction to said main direction.

3. A climate control device according to claim 1, wherein said jacket has an outer edge having a diameter which is substantially twice the outer diameter of said outlet.

4. A climate control device according to claim 3, wherein said outer edge and the opening of said outlet run substantially in the same radial plane.

* * * * *

UNITED STATES PATENT AND TRADEMARK OFFICE
CERTIFICATE OF CORRECTION

PATENT NO. : 5,868,312
DATED : February 9, 1999
INVENTOR(S) : Feldt

It is certified that error appears in the above-identified patent and that said Letters Patent is hereby corrected as shown below:

On the Title Page, after Item [22] insert

--Foreign Application Priority Data
July 23, 1996   [SE]   Sweden        9602842-8--

Signed and Sealed this

Twenty-seventh Day of July, 1999

Attest:

Q. TODD DICKINSON

*Attesting Officer*          *Acting Commissioner of Patents and Trademarks*